(12) United States Patent
Matsumoto

(10) Patent No.: US 8,083,391 B2
(45) Date of Patent: Dec. 27, 2011

(54) PLANAR LIGHT SOURCE AND DISPLAY DEVICE HAVING THE SAME

(75) Inventor: Shigeyuki Matsumoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 568 days.

(21) Appl. No.: 11/941,535

(22) Filed: Nov. 16, 2007

(65) Prior Publication Data

US 2008/0137368 A1 Jun. 12, 2008

(30) Foreign Application Priority Data

Nov. 17, 2006 (JP) ................ P2006-311510

(51) Int. Cl.
*F21V 7/04* (2006.01)
(52) U.S. Cl. ........................ 362/609; 362/614
(58) Field of Classification Search ............... 362/609, 362/614
See application file for complete search history.

(56) References Cited

U.S. PATENT DOCUMENTS

| | | | |
|---|---|---|---|
| 2001/0055204 A1 * | 12/2001 | Mitsuteru | 362/27 |
| 2002/0109804 A1 | 8/2002 | Tsubokura et al. | |
| 2003/0123258 A1 | 7/2003 | Nitto et al. | |
| 2005/0237761 A1 * | 10/2005 | Lasota | 362/551 |

FOREIGN PATENT DOCUMENTS

| | | |
|---|---|---|
| JP | 6-230229 | 8/1994 |
| JP | 8-307608 | 11/1996 |
| JP | 08307608 A * | 11/1996 |
| JP | 9-259625 | 10/1997 |
| JP | 2002-244128 | 8/2002 |
| JP | 2004-029597 | 1/2004 |
| JP | 2004-103303 | 4/2004 |

OTHER PUBLICATIONS

Office Action issued Jan. 25, 2011 in Japan Application No. 2006-311510 (With English Translation).

* cited by examiner

*Primary Examiner* — Diane Lee
*Assistant Examiner* — Sean Gramling
(74) *Attorney, Agent, or Firm* — Oblon, Spivak, McClelland, Maier & Neustadt, L.L.P.

(57) ABSTRACT

A planar light source of the present invention has three lamps along a side face of a rectangular light guide plate. The lamps are arranged along an incidence plane which is one side plane of the light guide plate. The three lamps are arranged so as to be kept apart from each other at a given interval, and two lamps are arranged in close proximity to the incidence plane that is one side plane of the light guide plate. One lamp is arranged away from the incidence plane that is one side plane of the light guide plate with respect to the two lamps. A lamp reflector is formed continuously so as to become close to the three lamps and surround the respective three lamps, and assumes a substantially convex cross-sectional shape.

4 Claims, 4 Drawing Sheets

PLANAR LIGHT SOURCE AND DISPLAY DEVICE HAVING THE SAME

This application claims priority from Japanese Patent Application No. 2006-311510 filed on Nov. 17, 2006, the entire subject matter of which is incorporated herein by reference.

BACKGROUND OF THE INVENTION

1. Field of the Invention

The present invention relates to a planar light source of side light type in which lamps are arranged along side faces of a light guide plate, and particularly to a planar light source of side light type in which a plurality of lamps are arranged and a display device having the planar light source.

2. Description of the Related Art

In order to realize a high-brightness display device, there is recently disclosed a technique for enhancing the brightness of a planar display device disposed behind a display element by means of increasing the number of lamps.

In a backlight device described in JP-A-6-230229 (pp. 2 to 3, FIGS. 2 through 4), a light source 1 is placed in a number of three along each of mutually-opposing two sides of a light guide plate 4, thereby achieving high brightness. However, the light sources 1 are arranged in an overlapping manner, and the luminous efficiency of the light sources 1 is deteriorated by influence of the heat developing from the light sources 1, to thus raise a problem of a failure to achieve enhanced brightness.

In a planar light source described in JP-A-9-259625 (pp. 2 to 7, FIGS. 1 and 2), lamps 1 are fixed by means of a lamp reflector 3 by way of a rubber holder 2, thereby keeping the lamps 1 spaced apart from each other at a predetermined interval so as not to contact each other.

In a backlight device described in JP-A-2003-197018 (pp. 4 to 9, FIGS. 6 through 8), when a plurality of fluorescent tubes 23 are placed, the center fluorescent tube 23 becomes most heated. For this reason, the center fluorescent tube 23 is displaced in proximity to a holder 27, thereby realizing a structure for efficiently transferring heat to the holder 27. However, such a structure encounters a problem of variations in the longevities of the respective fluorescent tubes 27 as well as a problem of occurrence of variations in leakage currents from the fluorescent tubes 23 and a failure to attain brightness proportional to the number of tubes.

SUMMARY OF THE INVENTION

The present invention has been conceived to solve the problems, such as those mentioned above, by means of a planar light source of side light type in which a plurality of lamps are disposed. In the light source, even when the number of lamps is increased, the lamps are maintained at an optimum temperature, to thus be retained in a state where high luminous efficiency is achieved. Hence, brightness can be enhanced. Moreover, the present invention aims at providing a planar light source which protects a display element positioned above the lamps from the influence of heat.

There can also be acquired a planar light source capable of achieving desired brightness by preventing occurrence of variations in leakage currents from the lamps. Further, since the variations in leakage currents can be prevented, variations in the longevities of the lamps can also be diminished.

A planar light source of the present invention is characterized by comprising: a light guide plate for guiding light to exit from an exit plane of the light guide plate; three lamps arranged along one side plane of the light guide plate; a lamp reflector which is formed so as to cover the three lamps and which guides light from the three lamps toward the one side plane of the light guide plate, wherein: the three lamps are arranged while being kept away from each other at a given interval; two lamps are arranged in close proximity to the one side plane of the light guide plate; one lamp is arranged away from the two lamps with reference to the one side plane of the light guide plate; the lamp reflector is continually formed so as to become close to the three lamps and surround the respective three lamps; and the lamp reflector has a substantially convex cross-sectional shape.

In the planar light source of the present invention, three lamps are arranged so as to be kept away from each other at a given interval; two lamps are arranged in close proximity to the one side plane of the light guide plate; one lamp is arranged away from the two lamps with reference to the one side plane of the light guide plate; and the lamp reflector is continually formed so as to become close to the three lamps, to surround the respective three lamps, and to assume a substantially convex cross-sectional shape. Since the lamps are maintained at an optimum temperature and high luminous efficiency can be kept, brightness can be enhanced. Moreover, there can be provided a planar light source which protects a display element disposed on the planar light source from the influence of heat.

DETAILED DESCRIPTION OF THE PREFERRED EMBODIMENT

Figure 1:
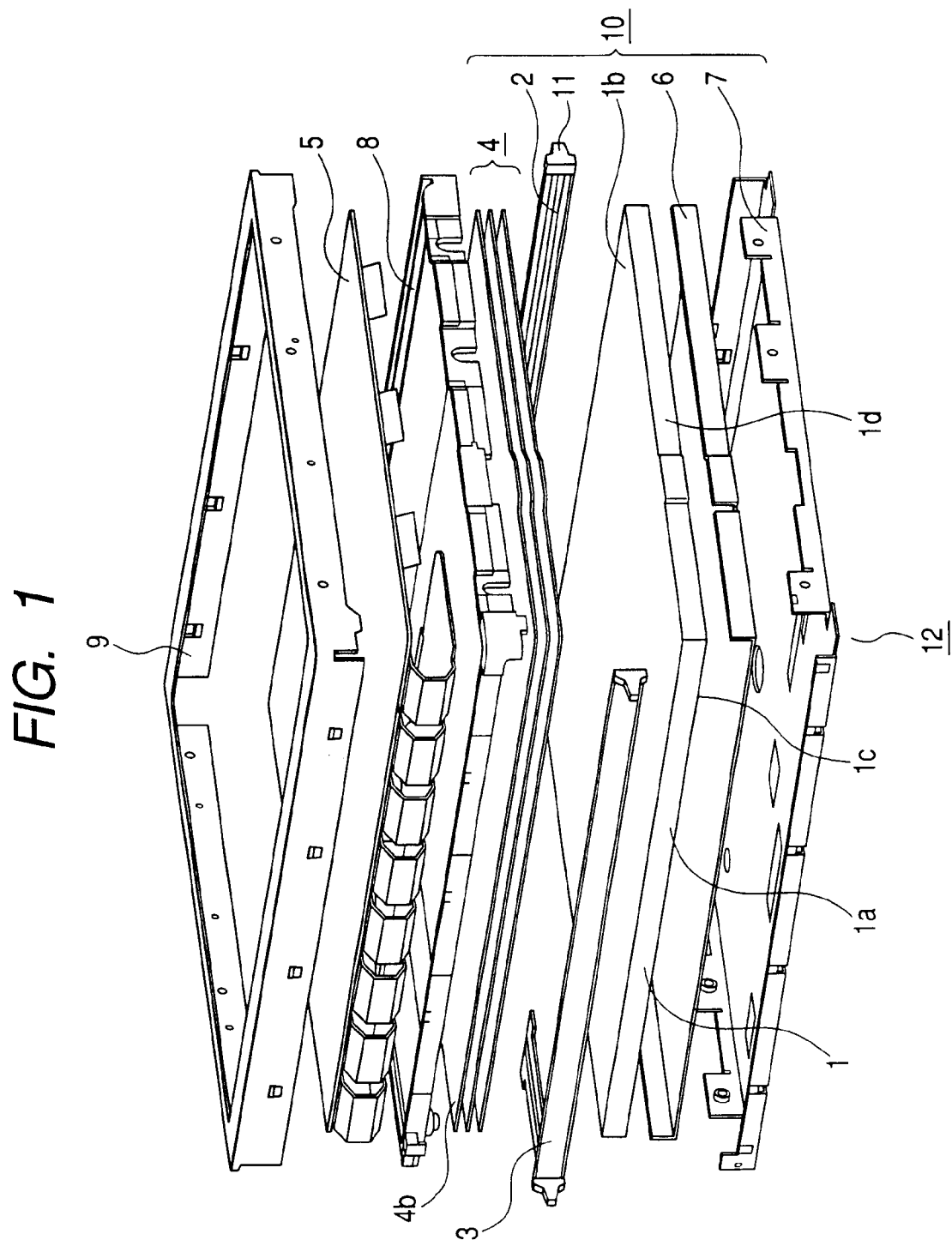
FIG. 1 is an exploded perspective view of a display device according to an embodiment of the present embodiment.

An embodiment of the configuration of a planar light source of the present invention will be described hereunder by reference to the drawings. Throughout the drawings, like reference numerals designate substantially analogous configurations.

First Embodiment

Figure 2:
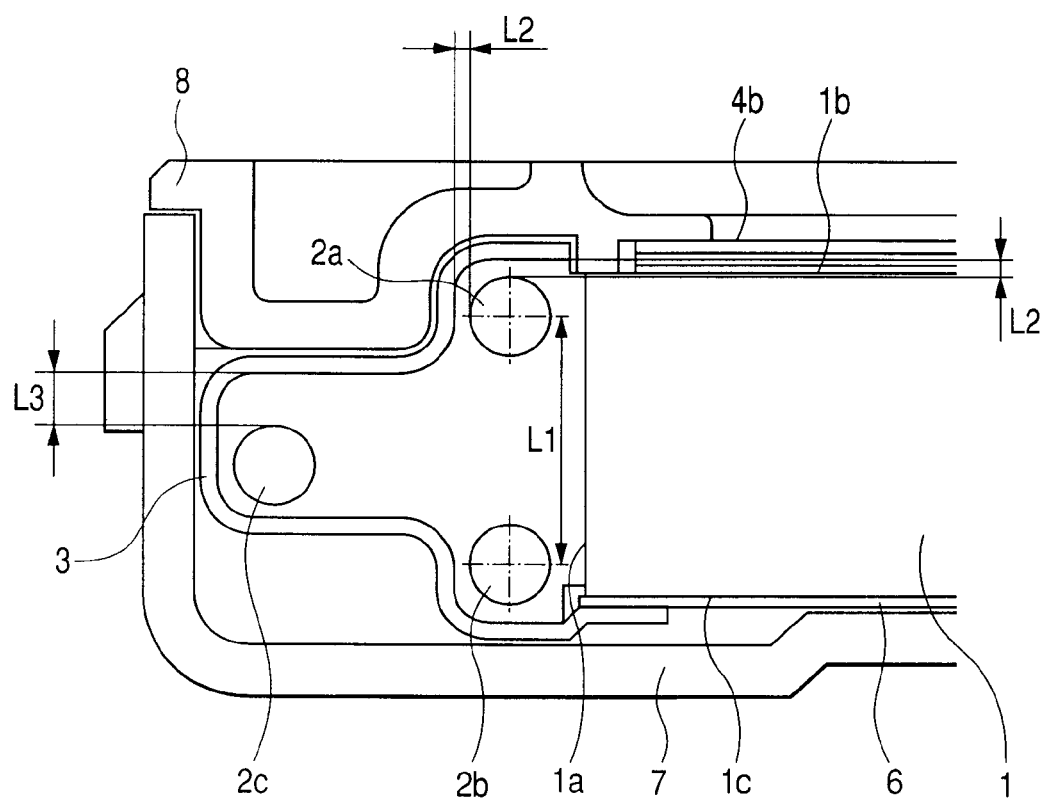
FIG. 2 is a cross-sectional view of the principal section of the display device shown in FIG. 1.
Figure 3:
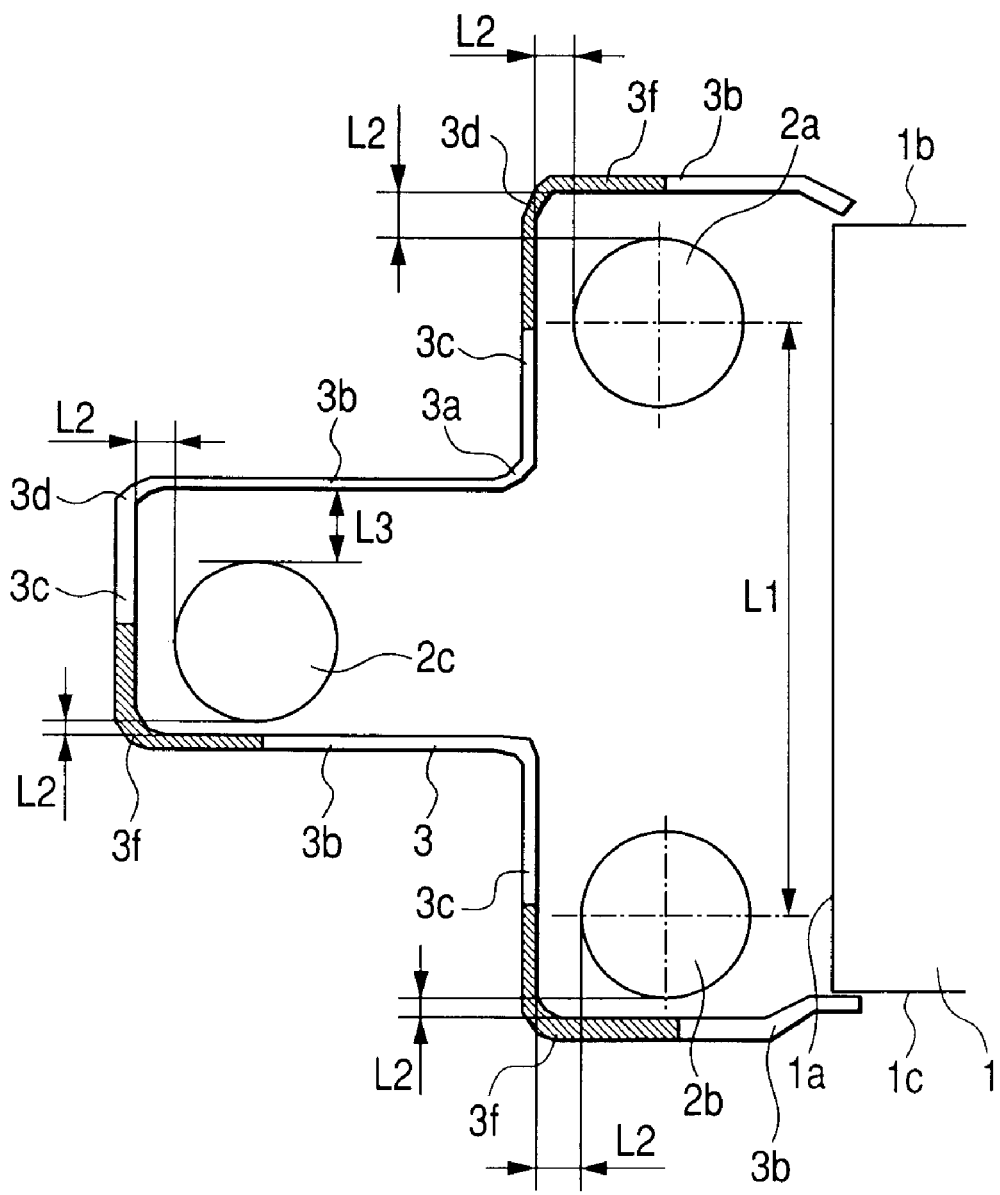
FIG. 3 is a cross-sectional view of the principal section of the display device shown in FIG. 1.

FIG. 1 is an exploded perspective view showing the essential configuration of an embodiment of a display device having a planar light source according to the first embodiment of the present invention. FIGS. 2 and 3 are cross-sectional views of the principal section of the display device shown in FIG. 1.

In FIGS. 1 and 2, the planar light source of the first embodiment has a plurality of lamps 2 along side surfaces of a rectangular light guide plate 1. The lamps 2 are arranged in a number of three along a plane of incidence 1a (an incidence plane) that is one side plane of the light guide plate 1. A lamp reflector 3 is provided so as to cover the lamps 2 and reflects the light exited from the lamps 2 so as to travel toward the incidence plane 1a of the light guide plate 1. The light having entered the incidence plane 1a of the light guide plate 1 propagates through the light guide plate 1 while undergoing total reflection within the light guide plate and exits from an exit plane 1b, to thus enter a group of optical sheets 4 disposed opposite the exit plane 1b. The light—which exhibits uniform brightness after having been gathered and diffused by the group of optical sheets 4—enters a display element 5 disposed opposite an outgoing plane 4b of this group of optical sheets 4. The light traveling toward the rear plane 1c that is opposite the exit plane 1b of the light guide plate 1 is again caused to travel toward the light guide plate 1, or a reflection sheet 6 for reflecting light is provided on side planes 1d which are not provided with the lamps 2, thereby causing the exited light to again travel toward the light guide plate 1. A rear frame 7 having opening sections is provided on the back of the reflection sheet 6, to thus house the light guide plate 1, the lamps 2, the lamp reflector 3, and the group of optical sheets 4. A middle frame 8 is provided on an exit plane of the group of optical sheets 4, thereby forming a planar light source 10. A display element 5 is provided on this planar light source 10 and fastened with a front frame 9, whereby a display device 12 can be assembled.

Figure 4:
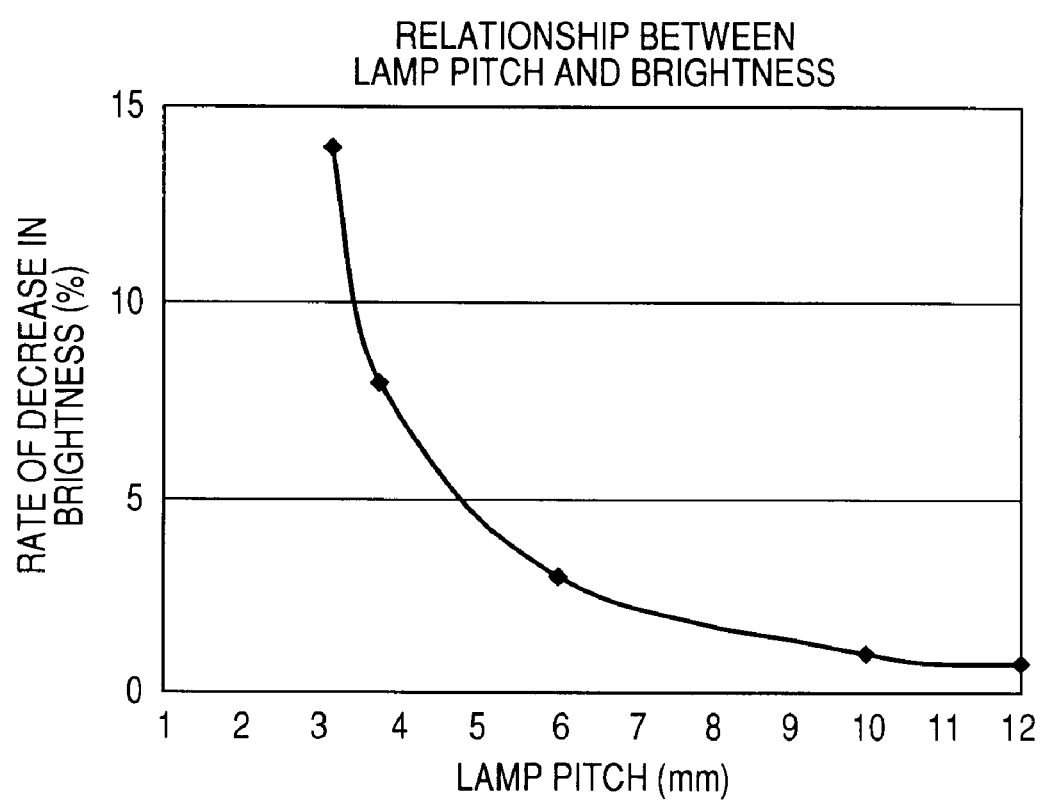
FIG. 4 is a view showing a relationship between a lamp pitch and brightness in the embodiment.

The layout of the lamps 2 of the present embodiment will now be described in detail. In FIGS. 1 and 2, the lamps 2 are disposed in a number of three substantially in parallel with each other along the incidence plane 1a that is one side plane of the light guide plate 1. Of the three lamps 2 (2a to 2c), two lamps are arranged in close proximity to the exit plane 1b of the light guide plate 1, and one lamp is disposed away from the exit plane 1b. More specifically, the first lamp 2a is placed while being kept away from the exit plane 1b at a given interval, and the second lamp 2b is placed while being kept away from the rear plane 1c at a given interval. The third lamp 2c is placed while being separated away from the incidence plane 1c of the light guide plate 1. The three lamps 2a to 2c are placed while being kept away from each other at a given interval, so as to form a substantially triangular cross-sectional shape. The lamps 2 are fixed by positioning rubber holders 11 at both ends of the respective lamps 2. When an interval L1 (the minimum distance from the center of one lamp 2 to the center of the other lamp 2 which will be hereinafter called a "lamp pitch") between the lamps 2 is too small, temperatures of the respective lamps increase, which in turn results in a decrease in luminous efficiency. However, when the lamp pitch is too large, the temperatures of the lamps 2 do not increase, which in turn leads to a decrease in luminous efficiency. The reasons for this are that the temperatures of the lamps 2 increase at the time of illumination and that, when the lamps 2 are illuminated within an optimum temperature range, the luminous efficiency of the lamps 2 can be maintained at the maximum level. FIG. 4 shows a graph plotting a relationship between the lamp pitch L1 and the brightness of the lamps 2 achieved when the lamps 2 of the first embodiment are used. As shown in FIG. 4, when the lamps are arranged such that the lamp pitch L1 ranges from 4 mm to 12 mm, there is a range where the temperatures of the lamps become optimum. When the lamp pitch L1 is set to 10 mm or more, it may be the case where an increase arises in the thickness of the planar light source 10 or where narrowing of a frame cannot be achieved. Therefore, it is better to place the lamps 2 such that the lamp pitch L1 falls within a range from 5 mm to 10 mm, whereupon the luminous efficiency of the lamps 2 can be maintained at the highest level. Hence, the brightness of the planar light source 12 can be enhanced. Now, a lamp having a gas pressure of 60 to 100 Torr, an argon ratio of 3% to 10% in an argon-to-neon ratio, and an inner diameter of Φ 1.8 to 2.4 is assumed to be used as the lamps 2 adopted in the first embodiment.

Next, the lamp reflector 3 will be described in detail. As shown in FIG. 2, the lamp reflector 3 is formed from a material exhibiting high thermal conductivity, such as metal. A high-reflectance plastic sheet which reflects light to a plane opposing the lamp 2 is affixed to the lamp reflector 3. The lamp reflector 3 is configured so as to cover all of the three lamps 2 arranged along the incidence plane 1a that is one side plane. The lamp reflector 3 is also formed continuously so as to enclose the respective three lamps 2 and assume a substantially convex cross-sectional shape. A more detailed explanation is provided. FIG. 3 shows an enlarged view of the principal section of the lamp reflector 3. In FIG. 3, in connection with the first lamp 2a and the second lamp 2b, the substantially C-shaped lamp reflector 3 has a parallel plane 3b substantially parallel to the exit plane 1b of the light guide plate 1 (or the rear plane 1c) and a vertical plane 3c substantially perpendicular to the exit plane 1b (or the rear plane 1c). The parallel plane 3b and the vertical plane 3c are connected together by means of a curved plane 3d. In connection with the third lamp 2c, the lamp reflector 3 has two planes 3b parallel to the exit plane 1b, the plane 3c perpendicular to the exit plane 1b, and curved surfaces 3d connecting the planes 3b to the plane 3c. The third lamp 2c is covered with the lamp reflector 3 having a substantially C-shaped form. These planes are formed continuously by means of indentations 3a so as to cover all of the first lamp 2a to the third lamp 2c, thereby assuming a substantially convex shape. The parallel plane 3b and the vertical plane 3c may also have a slope or a curved surface and the plane 3d serving as a connection plane may not be a curved surface, so long as the shape formed from these planes covers the lamps 2.

In FIGS. 1 through 3, the heat developing from the lamps 2 can be dissipated more efficiently as a distance L2—over which the lamps 2 and the lamp reflector 3 come close to each other—becomes smaller. However, the minimum thickness that is a limitation on molding of the rubber holders 11 fixedly supporting the lamps 2 requires 0.4 mm or more at a position between the lamps 2 and the lamp reflector 3. Accordingly, the lamp reflector is formed such that the shortest distance L2 over which the lamps 2 and the lamp reflector 3 come close to each other ranges from 0.4 mm to 1 mm. In order to attain the highest heat dissipation effect, it is better to set the distance L2 to 0.8 mm or less. So long as at least the distance L2 between the parallel plane 3b of the lamp reflector 3 and the lamps 2 or the distance L2 between the perpendicular plane 3c of the lamp reflector 3 and the lamps 2 ranges from 0.4 mm to 0.6 mm, the heat of the lamps 2 can be dissipated efficiently.

In FIGS. 2 and 3, when the plurality of lamps 2 are arranged, there exist the influence of the heat developing from the lamps 2 and the influence of variations in leakage currents from the lamps 2 resulting from use of the metal lamp reflector 3. The leakage currents increase in proportion to a distance and an area over which the lamps 2 and the lamp reflector 3 come close to each other. Hence, when the distance and the area over which the lamps 2 and the lamp reflector 3 come close to each other are not constant, it may be the case where variations arise in leakage currents and where variations arise in brightness and longevities of the respective lamps 2. For these reasons, as shown in FIG. 3, the lamp 2 and a proximal section 3f of the lamp reflector 3 are set as follows.

The distance L3 between the third lamp 2c and the lamp reflector 3, except the proximal section 3f, is set to 1 mm or more which is a distance at which the leakage currents decrease, in such a way that the area of the proximal section 3f where there is achieved a constant distance L2—over which the first lamp 2a, the second lamp 2b, and the lamp reflector 3 come close to each other—and the area of the proximal section 3f where there is achieved a constant distance L2—over which the third lamp 2c and the lamp reflector 3 come close to each other—become substantially constant. In the first embodiment, the lamps 2 and the lamp reflector 3 are arranged in such a way that a substantially constant space exists between the respective lamps 2 and the proximal sections 3f of the lamp reflector 3. Such a layout makes it possible to render constant variations in the leakage currents developing from the respective lamps 2. Brightness levels of the respective lamps 2 can be made constant, and variations in the longevities of the respective lamps can be reduced, to thus enable achievement of constant longevities.

As described above, in the presently preferred embodiment of the present invention, the three lamps 2 are arranged while being spaced apart from each other at a given interval. Two lamps are arranged in close proximity to the incidence plane 1a that is one side plane of the light guide plate 1, and one lamp is arranged away from the incidence plane 1a—which is one side plane of the light guide—with respect to the two lamps. The lamp reflector 3 is formed continuously so as to become close to and surround the three lamps 2 and assume a substantially convex cross-sectional shape. Accordingly, the heat developing from the lamps 2 can be dissipated efficiently, and the lamps 2 can be maintained at an optimum temperature, whereby high luminous efficiency can be maintained. Therefore, the brightness of the planar light source 10 can be enhanced. Further, the display element disposed above the planar light source can be protected from the influence of heat.

The lamp pitch L1 is set so as to fall within a range from 5 mm to 10 mm, whereby the temperature of the lamps 2 can be adjusted so as to fall within an optimum range. Hence, a high-brightness planar light source can be provided. Moreover, the minimum distance between the respective lamps 2 and the lamp reflector 3 is set so as to fall within a range from 0.4 mm to 1 mm, thereby enhancing the effect of dissipation of heat from the lamps 2. Furthermore, a layout is determined in such a way that the area of the proximal section 3f—where there is achieved a constant distance L2 over which the lamps and the metal lamp reflector 3 come close to each other—becomes constant, thereby rendering the leakage currents uniform and reducing variations in the brightness of the respective lamps 2. Variations in the longevities of the respective lamps 2 can also be reduced.

As shown in FIG. 2, the lamp reflector 3 is formed in such a way that the lamp reflector contacts portions of the metal rear frame 7, thereby enabling dissipation of the heat developing from the lamps 2 to the rear frame 7 by way of the lamp reflector 3. Since accumulation of heat in the lamp reflector 3 can be prevented, an increase in the temperature of the display element 5, which would otherwise be caused by transfer of heat from the planar light source 10, can be prevented.

What is claimed is:
1. A planar light source comprising:
(a) a light guide plate for guiding light to exit from an exit plane of the light guide plate;
(b) three lamps arranged along one side plane of the light guide plate;
(c) a lamp reflector which is formed so as to cover the three lamps and which guides light emitted from the three lamps toward the one side plane of the light guide plate, wherein:
(d) the three lamps are arranged while being kept away from each other at predetermined intervals;
(e) two of the three lamps are arranged in close proximity to the one side plane of the light guide plate;
(f) a distance between centers of the two lamps in a direction parallel to the one side plane of the light guide plate is L1;
(g) the third lamp is arranged farther away from the one side plane of the light guide plate than the two lamps and between the two lamps in the direction parallel to the one side plane of the light guide plate;
(h) the lamp reflector is continually formed so as to become close to the three lamps and surround the respective three lamps;
(i) the lamp reflector has a substantially convex cross-sectional shape that forms three vertical planes, each vertical plane adjacent a different lamp;
(j) the three lamps are spaced away from their respective plane in the direction perpendicular to the one side plane of the light guide plate by a distance of L2;
(k) the third lamp is spaced under a first horizontal plane of the lamp reflector in the direction parallel to the one side plane of the light guide plate by distance L3, wherein L1>L3>L2; and
(l) the third lamp is spaced above a second horizontal plane of the lamp reflector in the direction parallel to the one side plane of the light guide plate at a distance less than L3.

2. The planar light source according to claim 1, wherein the predetermined interval among the three lamps is determined such that a distance from the center of one lamp to the center of another lamp falls within a range from 5 mm to 10 mm.

3. The planar light source according to claim 1, wherein a minimum distance between the three lamps and the lamp reflector falls within a range from 0.4 mm to 1 mm.

4. A display device comprising:
the planar light source defined in claim 1; and
a display element placed on the planar light source.

* * * * *